United States Patent [19]
Mueller

[11] Patent Number: 5,630,762
[45] Date of Patent: *May 20, 1997

[54] METHOD OF MAKING A BOWLING PIN HAVING EXPANDED COPOLYMER CORE

[75] Inventor: Alvin W. Mueller, St. Louis, Mo.

[73] Assignee: Mueller-Perry Co., Inc., St. Louis, Mo.

[*] Notice: The term of this patent shall not extend beyond the expiration date of Pat. No. 5,354,239.

[21] Appl. No.: 427,150

[22] Filed: Apr. 24, 1995

Related U.S. Application Data

[63] Continuation-in-part of Ser. No. 290,211, Aug. 15, 1994, abandoned, which is a continuation-in-part of Ser. No. 79,040, Jun. 21, 1993, Pat. No. 5,354,239, and Ser. No. 105,364, Aug. 11, 1993, abandoned, and Ser. No. 735,001, Jul. 22, 1991, abandoned, which is a continuation-in-part of Ser. No. 438,048, Nov. 20, 1989, abandoned, which is a continuation-in-part of Ser. No. 294,654, Jan. 9, 1989, abandoned.

[51] Int. Cl.$^6$ .................................................. A63B 63/00
[52] U.S. Cl. .......................... 473/119; 473/124; 264/48; 264/274
[58] Field of Search .................................. 473/118, 119, 473/124; 264/41, 45.1, 48, 274, 278; 425/11; 427/140; 156/94, 98

[56] References Cited

U.S. PATENT DOCUMENTS

| | | | |
|---|---|---|---|
| 2,180,676 | 11/1939 | Guimond | 273/82 |
| 2,517,116 | 8/1950 | Klinger | 273/82 |
| 2,738,977 | 3/1956 | Riley | 273/82 |
| 3,169,020 | 2/1965 | Smith | 273/82 |
| 3,186,713 | 6/1965 | Hebble | 273/82 |
| 3,229,978 | 1/1966 | Guglielmo, Sr. | 273/82 |
| 3,232,616 | 2/1966 | Conklin et al. | 273/82 |
| 3,237,945 | 3/1966 | Isenberg et al. | 273/82 |
| 3,240,646 | 3/1966 | Smith | 156/213 |
| 3,301,560 | 1/1967 | Satchell et al. | 273/82 |
| 3,397,889 | 8/1968 | Smith | 273/82 |
| 3,445,113 | 5/1969 | Satchell et al. | 273/82 |
| 3,477,721 | 11/1969 | Satchell et al. | 273/82 |
| 3,525,524 | 8/1970 | Schmid | 273/82 |
| 3,619,436 | 11/1971 | Gruss | 264/45 |
| 3,971,837 | 7/1976 | Hasegawa et al. | 264/46.6 |
| 4,258,106 | 3/1981 | Cottrell, Jr. | 428/482 |
| 4,322,078 | 3/1982 | Mallette | 273/82 B |
| 4,445,688 | 5/1984 | Frillici et al. | 273/82 R |
| 4,457,511 | 7/1984 | Witkowski | 273/82 R |
| 4,630,820 | 12/1986 | Bertozzi | 273/82 R |
| 4,865,320 | 9/1989 | Unterberger | 273/182 B |
| 4,971,322 | 11/1990 | Jager | 273/82 R |

FOREIGN PATENT DOCUMENTS

| | | |
|---|---|---|
| 974717 | 9/1975 | Canada. |
| 1058307 | 2/1967 | United Kingdom ............ A63D 9/00 |

OTHER PUBLICATIONS

Design Considerations and Guide Specifications, Urethane Foam Contractors Association, paragraph 6.01, p. 9.
Adhesion and Bonding, Norbert M. Bikales, Ed., Wiley-Interscience Publishers; pp. 137–142, specifically p. 139.
Dow Plastics "Ployurethanes: Versatile Polymers for Today and Tomorrow" pp. 3–4, 23 ©1990.

Primary Examiner—William M. Pierce
Attorney, Agent, or Firm—Jerome A. Gross

[57] ABSTRACT

Bowling pins formed by molding a plastic shell about a foamed plastic core have not heretofore come into practical use because of inability to withstand shocks in service, resulting in separation of the shell from the core. According to the present invention, a foamed thermoset (non-melting) copolymer is employed for casting the core. Thereafter, before casting a plastic shell thereabout, the core surface area is substantially increased by simply removing the core surface skin, thereby opening the outermost thermoset core cells for filling by the shell material.

2 Claims, 1 Drawing Sheet

METHOD OF MAKING A BOWLING PIN HAVING EXPANDED COPOLYMER CORE

CROSS-REFERENCE TO RELATED APPLICATIONS

This is a continuation-in-part of application Ser. No. 08/290,211 filed Aug. 15, 1994, now abandoned, which was a continuation-in-part of both U.S. Pat. No. 5,354,239, issued Oct. 11, 1994 on application Ser. No. 08/079,040, filed Jun. 21, 1993, and of Ser. No. 08/105,364, filed Aug. 11, 1993, abandoned; both continuations-in-part of application Ser. No. 07/735,001, filed Jul. 22, 1991, abandoned; which was a continuation-in-part of application Ser. No. 07/438,048, filed Nov. 20, 1989, abandoned; which was a continuation-in-part of application Ser. No. 07/294,654, filed Jan. 9, 1989, abandoned.

BACKGROUND OF THE INVENTION

1. Field of the Invention

This invention relates to bowling pins having a foam plastic core and a solid plastic shell molded thereon and secured thereto by a greatly increased interface area.

2. Description of Related Art

Short supply of suitable woods make important the development of plastic bowling pins, whose performance in competition must be equivalent to approved wood pins.

Experimental bowling pins have heretofore been made with plastic shells molded over wood or foam plastic cores. Such pins have experienced serious problems of separation of the shell from the core. There have been some attempts, as in U.S. Pat. No. 3,971,837 to Hasegawa, to solve this problem by forming a few grooves in the exterior surface of the core, and casting the plastic shell thereabout. The grooves so formed do not appear to afford any substantial increase in area of the shell-to-core interface.

British Patent No. 1,058,307 discloses a proposed bowling pin having an expanded monomer foam core about which is molded a similar monomer shell; it discloses that pouring the liquid monomer shell plastic around a preformed monomer core softens and partially solvates the core so as to form a chemical union between the previously formed monomer core and the monomer shell. Neither monomers nor thermoplastic polymers would ordinarily be considered as suited for bowling pin cores, since they would soften under the heat of the later-mold shell. FIG. 7 of the British patent shows the outer portions of the core have been so badly distorted by such softening, when the shell was poured about it, as to lose concentricity. Applicant doubts whether such pins have even been put to use, because resultant variations must affect the dynamic characteristics of the pin.

SUMMARY OF THE INVENTION

Opposite to the approach of the British patent, which seeks to forge a chemical union between the core and the skin, the present invention effects a strong mechanical bond by greatly increasing the interface area. First is molded an expanded cross-linked thermoset polymer core, e.g. a polyurethane foam core.

Inherently a core skin, comprised of the outer foam cell walls, is formed on the core exterior as the foam expands against the wall of the core mold. According to the present invention, before molding the shell, such core skin is removed, opening the core's outermost cells; thereafter when a plastic shell is molded about it, the liquid plastic fills and bonds physically within the cells so opened, to secure against separation by shock loads applied during bowling.

DESCRIPTION OF THE PREFERRED EMBODIMENT

Figure 1:
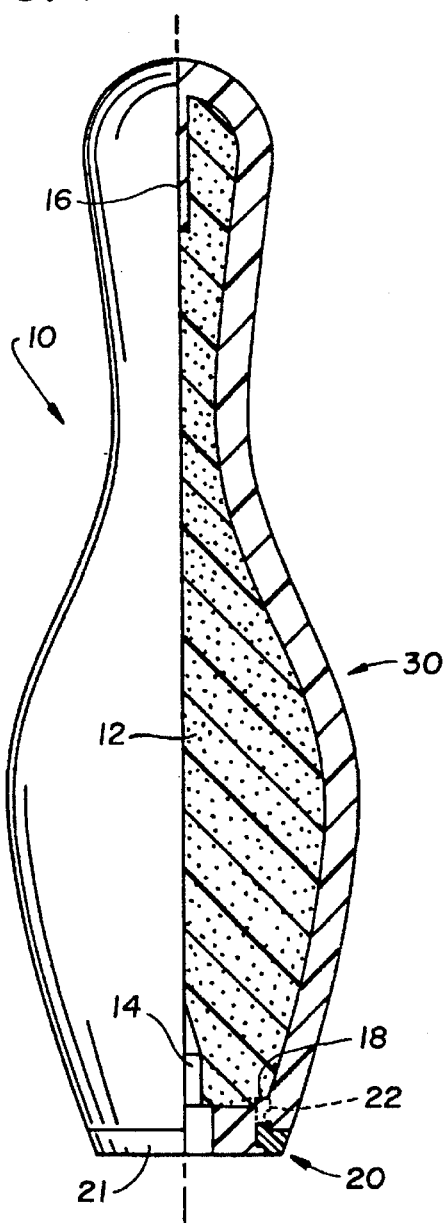
FIG. 1 is a side view, partly in elevation and partly in section, of the molded copolymer core of the present bowling pin, with a nylon base ring exploded downwardly. At its right side, pock-markings indicate opened cells at the core surface.
Figure 2:
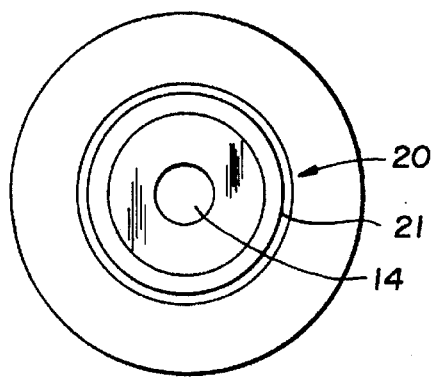
FIG. 2 is a bottom view of FIG. 1.
Figure 3:
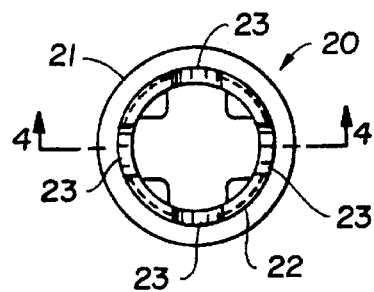
FIG. 3 is a top view of the base ring of FIG. 1.
Figure 4:
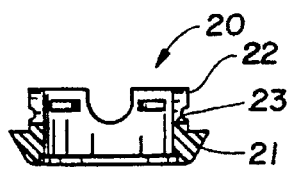
FIG. 4 is a vertical cross-sectional view of said base ring taken along line 4—4 of FIG. 3.

A bowling pin embodying the present invention, generally designated 10, is shown in FIG. 1. The bowling pin 10 has a foam core 12 shown in FIGS. 1 and 5, formed of a cross-linked (that is, thermoset) polymer, which therefore will not soften when liquid plastic for the shell is poured about it. I prefer to utilize a foamed polyurethane with a free-rise density of from five to eight pounds per cubic foot.

Figure 5:
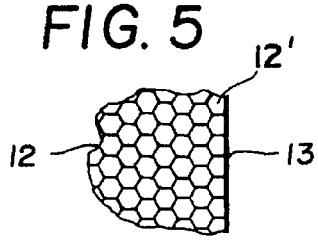
FIG. 5 is a greatly enlarged somewhat schematic sectional view of a small portion of the core prior to removal of its surface skin.

The gas pressure of adjacent cells, pressing against each other and with the outer cells 12' pressing against the surrounding mold wall, will somewhat flatten the outermost walls of cells 12' of the core 12 to form a skin 13. In FIG. 5, somewhat idealized for ease of illustration, these outermost cells are illustrated as being the same size.

After removing the core from its mold, its straightness is verified visually, and it is preferably weighed to check its conformity with pre-established limits. Its outer skin is then completely removed, conveniently by sanding or shot peening; it is again visually examined, checked for concentricity and weighed. If it does not satisfactorily meet these tests, it is discarded, and another core which meets them is substituted.

For proceeding with the manufacture, a shell material is selected for its hardness rating, for example, Shore rating 50 to 70. Since the core material to be used is a cross-linked polymer, no shell plastic subsequently molded about it—not even a similar polymer—can soften it to alter its shape, nor to bond chemically to it.

Figure 6:
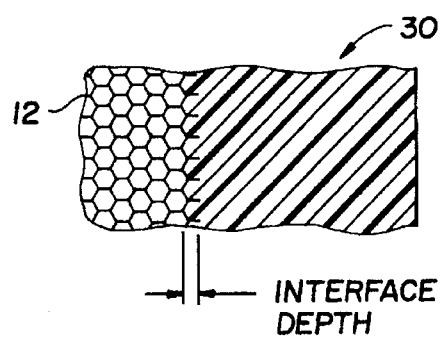
FIG. 6 is a view similar to FIG. 5 shown after the core surface skin has been removed to open its outermost cells, and the shell material has been molded to fill and cure therein. This figure illustrates the increased depth of interface (and the consequent great increase in interface area) between core and skin.

When the core skin shown in FIG. 5 is thereafter completely removed, the remaining side wall and inner wall portions of the outermost cells present a succession of hollow interface areas for bonding. Thereafter, when the core is supported within a larger shell mold and liquid plastic shell material is cast about the core, it enters these hollow open cells and fills them as illustrated in FIG. 6.

The increased interface depth which results and is there illustrated, may be considered somewhat idealized as a totality of single spherical cells each cut in half. When practical considerations are taken into account, such as the thicknesses of unbroken cell walls and the extent of cell wall breakage in the skin removal process, the increase in interface area will in any event be at least 50%. Such an increase in interface area furnishes a far greater order of core-to-shell bonding security than would be obtained by the grooves of Hasegawa U.S. Pat. No. 3,971,837.

Three macro-photographs, each taken at 14× magnification, verified that this increase in interface area does in fact take place.

A first macro-photograph shows a cross-section through an expanded polyethylene core before removal of its outer skin; it shows that the skin (as molded against the interior of a steel mold) is formed in a perfectly smooth line, while inward of the skin, cells have been formed of fairly uniform size.

A second macro-photograph shows a core cross-section seen after the removal of the outer skin by the sanding operation, which has smoothly sanded some cell walls while breaking others; so that shell plastic will penetrate not only deeply, but also partly sideward.

A third macro-photograph shows a cross-section taken after molding a polyurethane shell about the opened core cells; the cells, some with edge discontinuities and inter-cell spaces, are filled solidly with shell material which extends well inward of the original core surface. This deep core-and-shell interface assures against separation of the shell from the core.

The following precaution must be observed: the skin-removed core must be substantially moisture-free when its shell is cast about it. The open surface cells of cores from which the skin has been removed tend to accumulate moisture which may prevent the plastic shell material from bonding securely. Unless the shell is cast onto the core immediately after its skin removal, the core should be freed of moisture by baking, for example at 120° F. for 30 minutes. Other conventional procedures to maintain or restore dryness may be used, such as packing in plastic bags with desiccant material.

Bowling pins made according to this invention are so consistent throughout as to have passed tests not even required of wood pins, such as rotational balance. In this test, a pin is floated one side up in a tub of water, then, placing a small (5 gram) weight on its upward side must cause it to turn over.

In other tests, not only have the present pins demonstrated their substantial identity to wood pins in their dynamic reactions, but also in sounds of striking, thus demonstrating consistent freedom from voids between shell and core.

While I prefer using for the pre-formed core a polyurethane foam (which is unaffected by the warm liquid polyurethane which subsequently forms the shell thereabout), the present invention is not limited to polyrethane. Using a core of any expanded thermoset polymer (which inherently cannot melt from subsequent contact by a liquefied plastic shell material) assures preservation of the internal wall areas of the opened cells for an enlarged bonding interface. Accordingly, this invention affords a wide choice of both expanded core and solid shell materials.

Since various modifications may be made in the constructions and processes herein described and illustrated without departing from the scope of the invention, it is intended that all matter contained in the foregoing description or shown in the accompanying drawings shall be interpreted as illustrative rather than limiting.

I claim:

1. The process of making a bowling pin, comprising the steps of a. molding, against a mold wall of general bowling pin shape, a thermoset polymer foam plastic and causing or permitting such plastic to cure, thereby to form a foam cell core having a skin, b. withdrawing such core from such mold, c. physically removing at least the greater part of such skin, whereby to open cells formed against such mold wall, d. then positioning the core in a larger cavity mold, and e. pouring a non-foaming plastic therein about such core, whereby such non-foaming plastic extends inward into and fills such opened cells, f. then curing the non-foaming plastic or permitting it to cure, and then g. removing from such larger cavity mold, whereby such fill of such opened cells avoids separation of such shell from such core attendant to impacts on bowling pin use.

2. The process of making a bowling pin as defined in claim 1, together with the additional steps, taken after step c, of checking the core, with its skin so removed, for concentricity, and in event of lack of concentricity, discarding such core and repeating steps a, b and c with another core.

* * * * *